June 26, 1962     E. B. NOLT ETAL     3,040,508
HAY BALER

Filed Oct. 29, 1958     5 Sheets-Sheet 1

INVENTORS
EDWIN B. NOLT
& JAMES W. McDUFFIE
Joseph Allen Brown
ATTORNEY

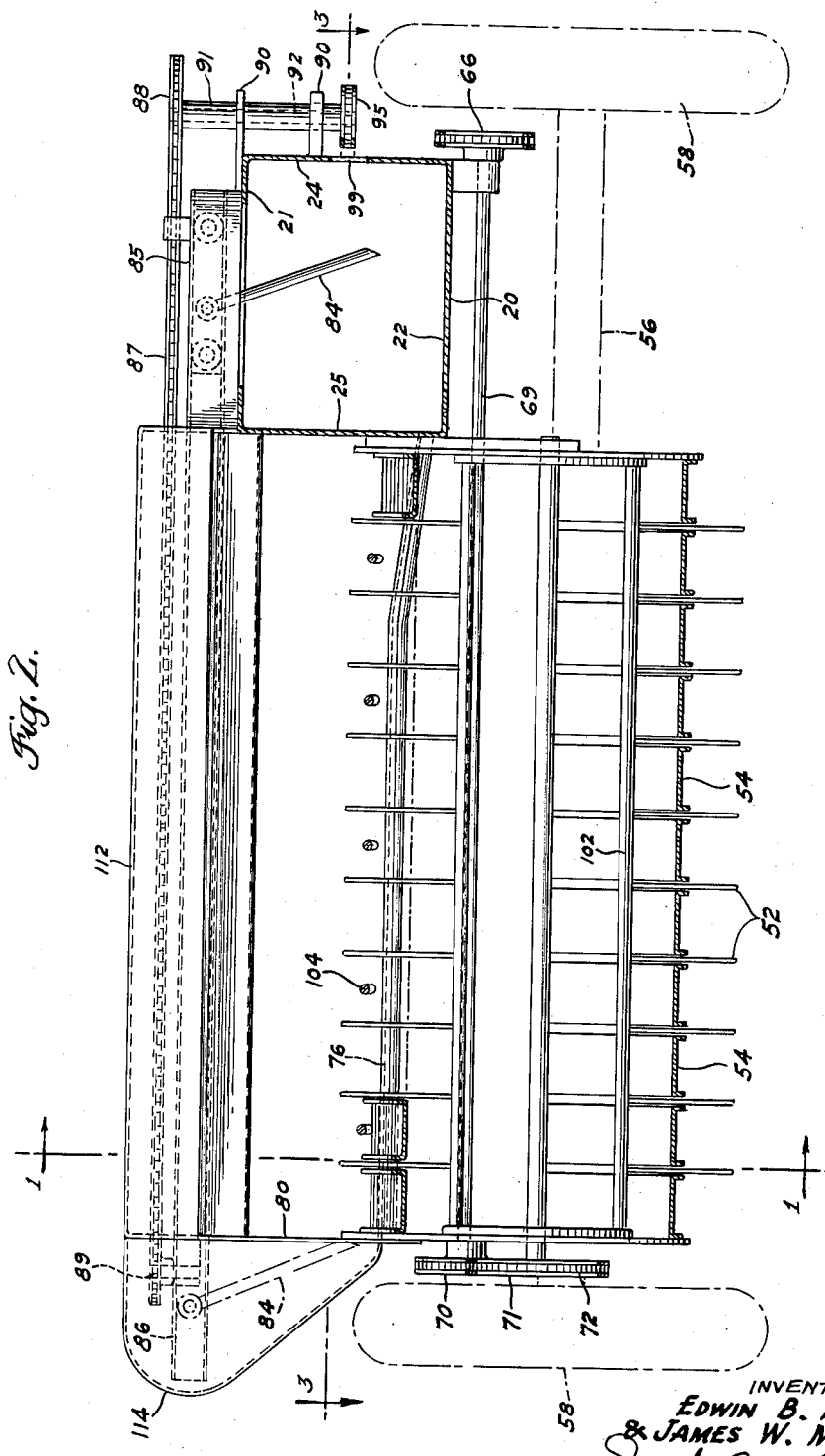

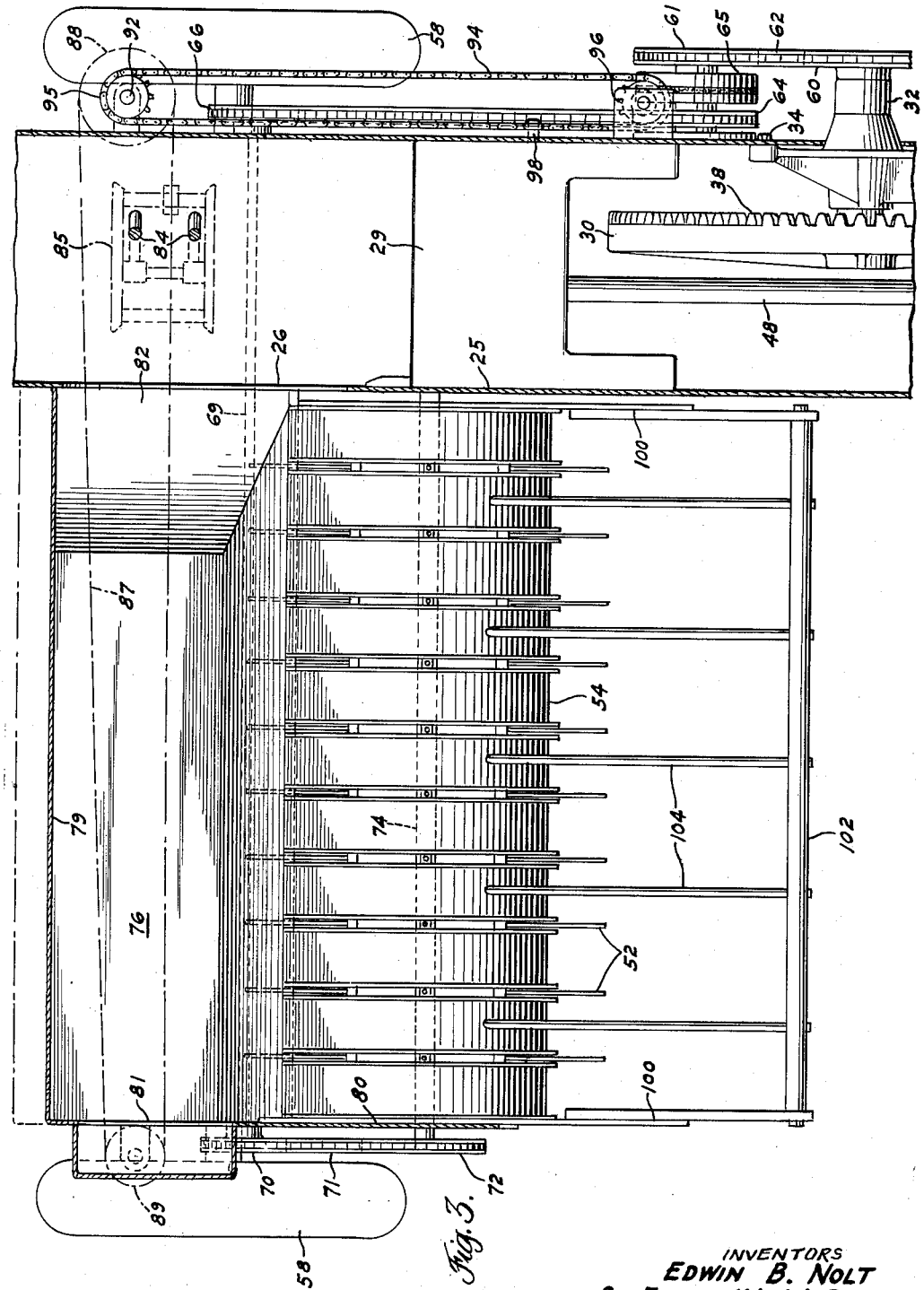

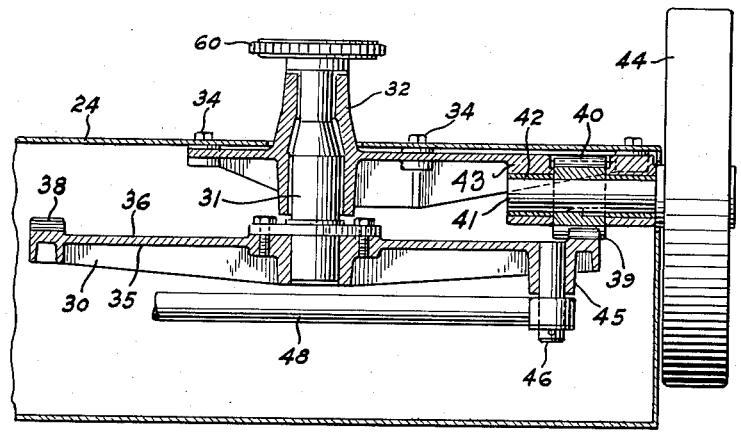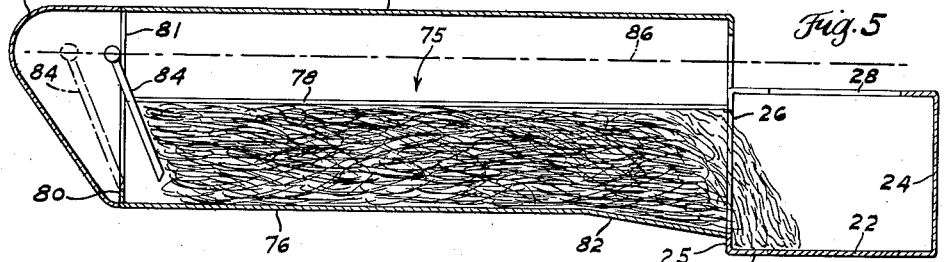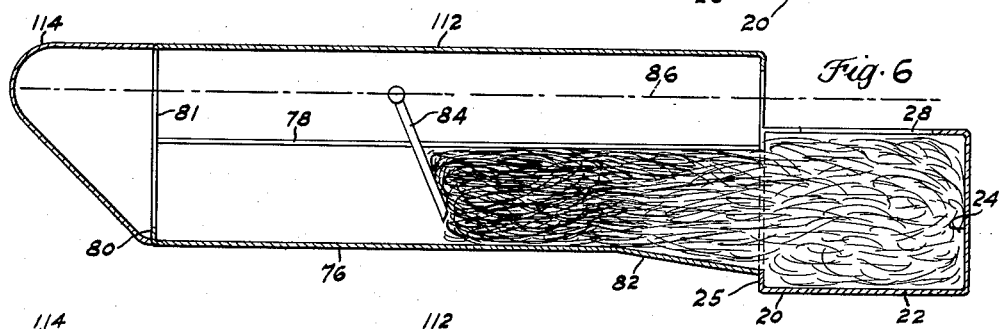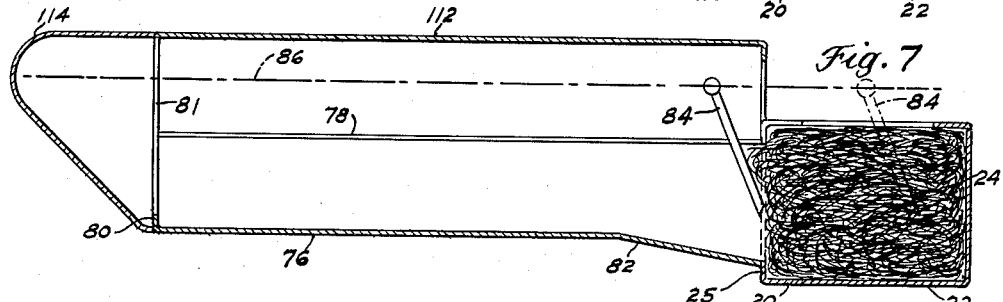
INVENTORS
EDWIN B. NOLT
& JAMES W. McDUFFIE
Joseph Allen Brown
ATTORNEY June 26, 1962 E. B. NOLT ETAL 3,040,508
HAY BALER
Filed Oct. 29, 1958 5 Sheets-Sheet 5
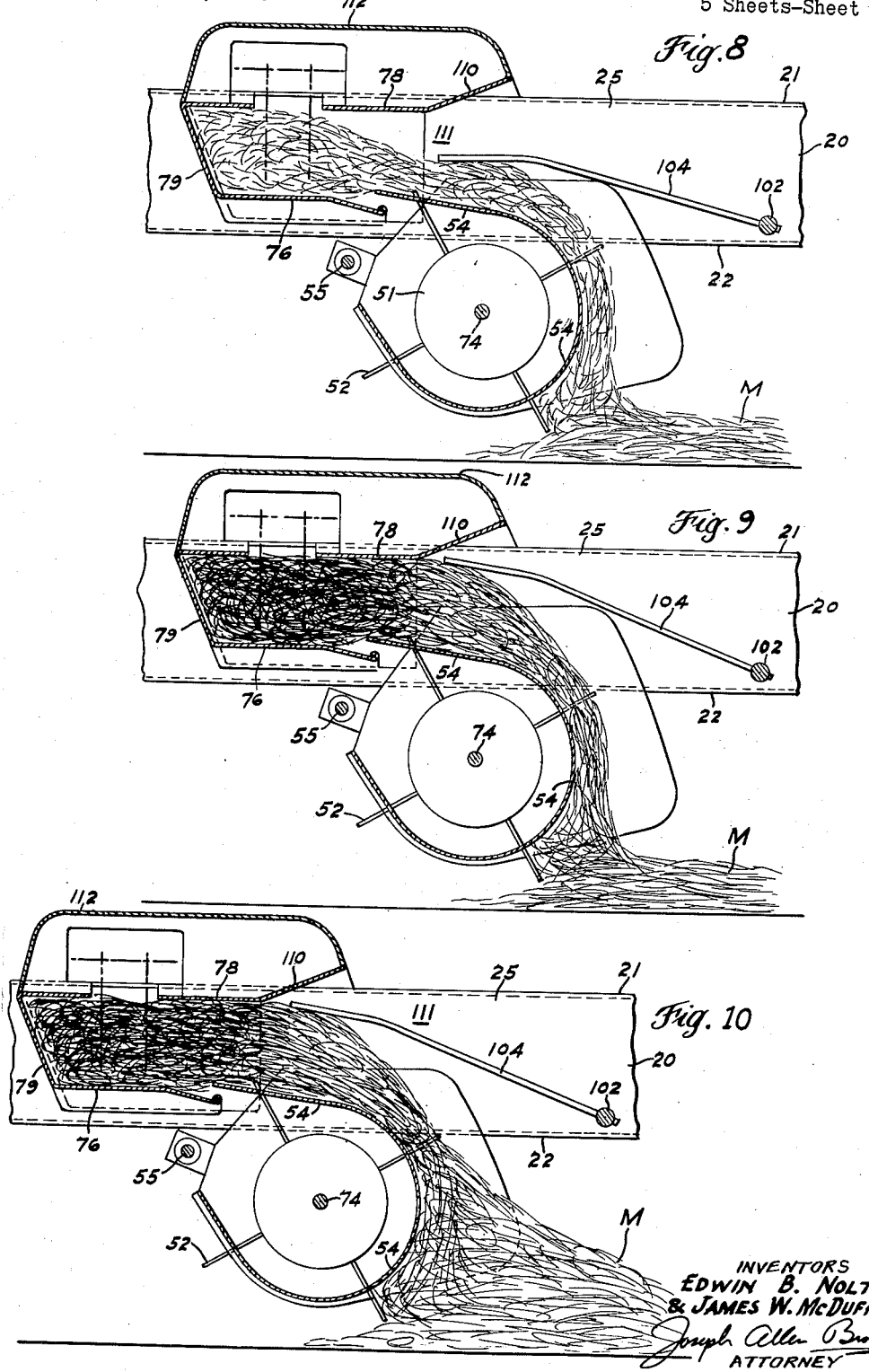
INVENTORS
EDWIN B. NOLT
& JAMES W. McDUFFIE
ATTORNEY

United States Patent Office 3,040,508
Patented June 26, 1962

3,040,508
HAY BALER
Edwin B. Nolt and James W. McDuffie, New Holland, Pa., assignors to Sperry Rand Corporation, New Holland, Pa., a corporation of Delaware
Filed Oct. 29, 1958, Ser. No. 770,409
2 Claims. (Cl. 56—341)

This invention relates generally to hay balers and more particularly to an improved infeed mechanism therefor.

A problem in the baling art has been to provide means for handling hay at a steady, uniform rate. Windrows in a given field will range from light to heavy and there is a tendency for the feed fechanisms to overfeed or underfeed material into the bale case between successive working strokes of the baler plunger. Underfeeding may be remedied by increasing ground speed so that more material will be picked up and conveyed into the bale chamber. However, overfeeding is more difficult to contend with. The fact that overfeeding has occurred becomes evident when the baler feed mechanism becomes jammed or plugged. When this occurs, in some balers it is necessary for the operator of the baler to get off the tractor towing it and manually pull the hay free from the infeed chamber until the jammed condition is cleared.

To project against overfeeding of material into a bale case, there has been provided, heretofore, feed mechanisms which meter hay into a bale chamber, resilient means being employed to permit the feeder to yield on a working stroke when a given quantity or density of material has been delivered to the bale case. Also, it has been known to provide a positive, unyielding feed mechanism and then to use therewith a hay pickup adapted to deliver material to an infeed chamber in which the feed mechanism operates, the pickup being provided with a clutch adapted to slip when a given amount of hay has been deposited in the infeed chamber. In all such structures, there is no particular relationship between the infeed chamber and the bale case or the amount of material which the infeed chamber can receive and hold.

Balers having yieldable feed mechanisms will not overfeed the bale cases and plug. However, the infeed chambers are capable of becoming overloaded, in which case the baler must be stopped for a few moments to allow the feed mechanism to get rid of the excess accumulation of hay. Likewise, in balers having a slip in the pickup, the balers are nevertheless capable of becoming plugged, such occurring when more material is directed to the bale case than the bale case can receive.

A main object of this invention is to provide a hay baler which will not become plugged regardless of the conditions under which the baler is operated.

Another object of this invention is to provide a baler structure having means whereby hay is delivered into a bale case in more uniform charges than has heretofore been provided.

Another object of this invention is to provide a feed mechanism adapted to convey hay into a bale case, there being provided means associated therewith for decompressing the hay as it is delivered toward the bale case.

A further object of this invention is to provide a hay baler structure which is such that the baler may be operated trouble-free and uniformly regardless of the ability or experience of the baler operator.

A still further object of this invention is to accomplish the foregoing objects with a structure which is relatively simple and inexpensive to manufacture and assemble.

Other objects of this invention will be apparent hereinafter from the specification and from the recital in the appended claims.

In the drawings:

FIG. 2 is a section taken on the line 2—2 of FIG. 1 and looking in the direction of the arrows;

FIG. 3 is a plan view of FIG. 1;

FIG. 4 is a fragmentary section taken on the line 4—4 of FIG. 1 looking in the direction of the arrows and showing the details of the plunger drive means;

FIGS. 5–7 are generally diagrammatic views illustrating the feeding of hay into the bale chamber of the baler; and FIGS. 8–10 are generally diagrammatic views similar to FIG. 1 and showing the operation of the baler pickup.

Figure 1:
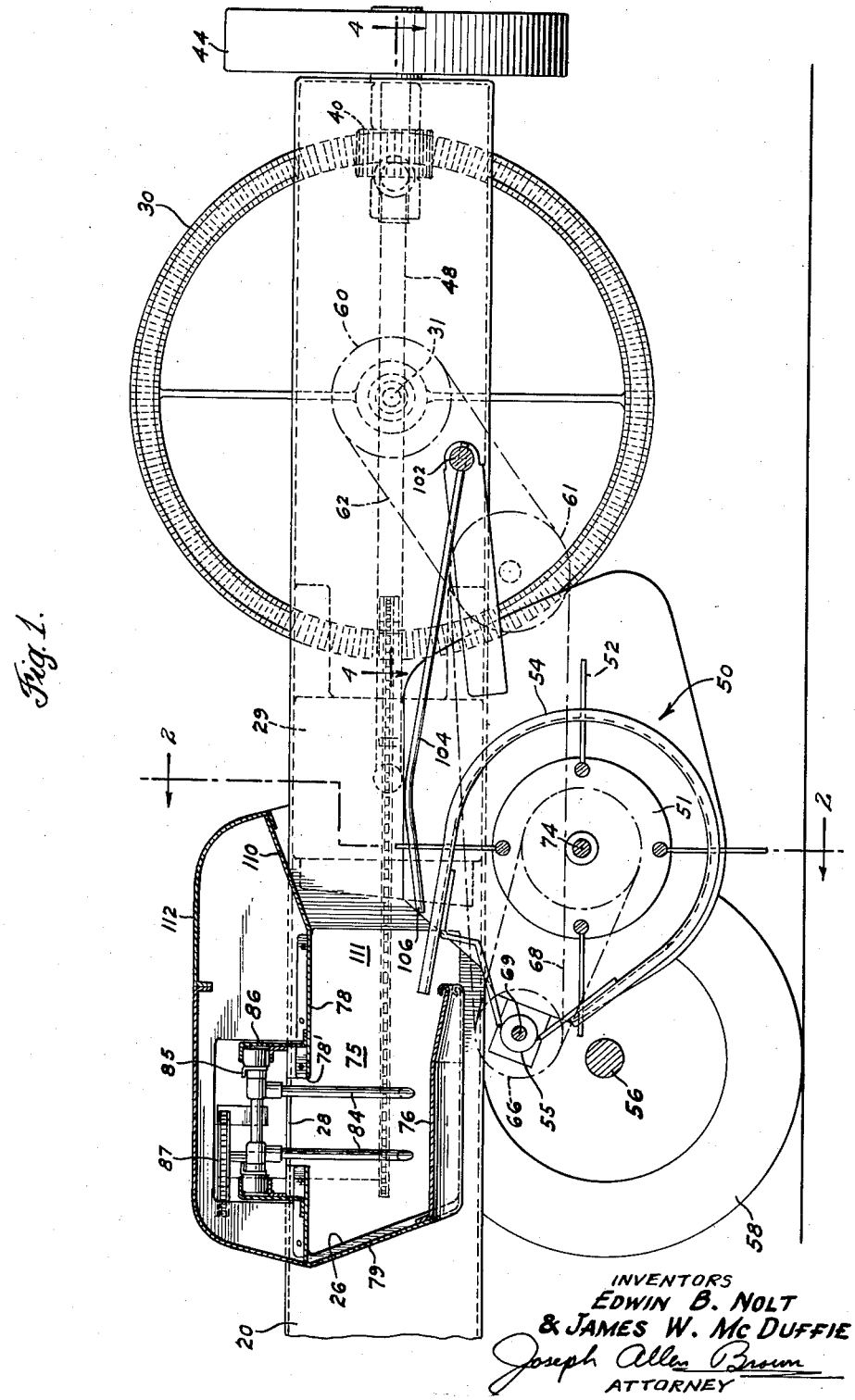
FIG. 1 is a section taken on the line 1—1 of FIG. 2 and showing in side elevation a hay baler constructed according to this invention.

Referring now to the drawings by numerals of reference, and particularly FIGS. 1–4, 20 denotes a bale case which is rectangular in cross section (FIG. 2). Bale case 20 extends in a fore-and-aft direction relative to ground travel and is disposed in horizontal relation to the ground. The case has a top wall 21, bottom wall 22 and opposed vertical side walls 24 and 25. Side wall 25 has an opening 26 through which crop material may be fed into the bale case. The top wall 21 has an opening or slot 28 (FIG. 1) communicating with opening 26.

Reciprocable fore-and-aft in the bale case 20 is a plunger 29. The plunger is adapted to be reciprocated by a drive comprising a gear 30 extending in a vertical plane and rotatable about a horizontal axis transverse to the reciprocation of said plunger. Gear 30 is supported on a shaft 31 (FIG. 4) journaled in a bearing support 32 connected by bolts 34 to side wall 24 of the bale case. Gear 30 has an inner face 35 and an outer face 36, axially spaced. The outer face 36 has radially extending, angularly spaced gear teeth 38 adjacent the periphery of the wheel which mesh with teeth 39 on a pinion 40. Pinion 40 is keyed to a shaft 41 rotatable in a bushing 42 supported on a portion 43 integral with the member 32 which supports the shaft 31. Shaft 41 is rotated from a source of power not shown such as the tractor used for towing the baler. A conventional flywheel 44 is included in the drive from the source of power to the pinion 40. It will be apparent that when the pinion rotates, the gear 30 will likewise be rotated.

The inside face 35 of gear 30 is provided with a sleeve 45 which supports a pivot pin 46 which extends parallel to the axis of the shaft 31. Pivotally connected to pin 46 is one end of a connecting rod 48 the opposite end of which is connected the the plunger 29. Thus, when the gear 30 is rotated, the plunger 29 is reciprocated.

Since the shaft 31 and pinion 40 are carried on the same bearing support 32, if the bearing support shifts relative to the bale case because of bolts 34 becoming loose for some reason, such as vibrations, then the gear 30 and pinion 40 will still be in the same relation relative to each other.

In its reciprocating movements, plunger 29 moves rearwardly on a working stroke and past the openings 26 and 28 in side wall 25 and top wall 21, respectively, and then retracts forwardly. Hay delivered to the bale chamber is compressed by the plunger into bales which move progressively rearwardly as they are formed. After each bale is completed, it is banded by a tying mechanism, not shown, and subsequently discharged rearwardly and onto the ground or into a trailing wagon.

Extending alongside of bale chamber wall 25 and forwardly of the opening 26 is a transverse rotatable pickup mechanism 50 comprising a reel 51 (FIG. 1) having angularly spaced rows of radially projecting pickup fingers 52. The pickup fingers 52 are separated by laterally spaced stripper members 54. The pickup is supported for pivotal movement about a shaft 55 suitably supported on a mobile chassis which includes an axle 56 supported at its opposite ends by ground wheels 58.

The pickup is rotated in a counterclockwise direction when viewed as shown in FIG. 1 through a drive which comprises a sprocket 60 keyed to the shaft 31. Sprocket 60 drives a sprocket 61 through endless chain 62. Sprocket 61 drives to a sprocket 64 through a slip clutch 65, FIG. 3, one element of the slip clutch being connected to sprocket 61 and the other element of the clutch being connected to sprocket 64. Sprocket 64 drives a sprocket 66 through an endless chain 68. Connected to the sprocket 66 in a cross shaft 69 which extends to the outboard side of the baler to a sprocket 70. An endless chain 71 connects sprocket 70 to a sprocket 72 keyed to a shaft 74 carrying reel 51.

Other details of the structure of the pickup and its drive may be similar to that shown in U.S. Patent No. 2,757,602 issued August 7, 1956. However, it is important to note that the pickup drive includes a clutch 65 adapted to slip if the pickup becomes overloaded.

Cut crop material resting on the ground in a windrow is engaged by the fingers 52 and elevated, the material sliding up and over the stripper plates 54, such material then being delivered rearwardly into an infeed chamber 75. Chamber 75 has a platform or base 76, a roof 78, a rear wall 79 and a side wall 80 extending parallel to side wall 25 of the bale case 20. Side wall 80 has an opening 81 in lateral register with the opening 26 in the bale case but of less fore-and-aft width than opening 26.

Platform 76 and roof 78 are parallel to each other as they extend from side wall 80. However, when the platform 76 reaches a point spaced from the side wall 25 of the bale case approximately ¼ the distance of the length of the platform, it diverges downwardly and away from the roof 78 as best shown in FIGS. 5–7. The diverging portion of the platform 76 is denoted 82.

Roof 78 is provided with an opening 78′ (FIG. 1) through which feed fingers 84 project downwardly. The feed fingers are supported on a carriage 85 reciprocable on a guide track 86 supported on roof 78. Carriage 85 is moved toward and away from bale case 20 by an oscillating endless chain 87 which extends around relatively spaced sprockets 88 and 89. Sprocket 89 is disposed outwardly of side wall 80 of the infeed chamber 75 (FIGS. 2 and 3). Sprocket 88 is disposed outwardly of the bale case 20. It is connected by means of vertically spaced brackets 90 to the bale case. Brackets 90 carry a sleeve 91 which rotatably supports a shaft 92 rotated by an endless chain 94 extending around sprockets 95 and 96. The sprocket 95 is connected to the lower end of shaft 92, while the sprocket 96 is supported on the side wall 24 of the bale case. The inner reach of chain 94 is connected to plunger 29 by a member 98 (FIG. 3) which projects through a fore-and-aft slot 99 in the bale case. When the plunger 29 is reciprocated, chains 94 and 87 are oscillated. The carriage 85 is moved toward and away from the bale case, the fingers 84 passing into the bale case between successive working strokes of the plunger.

As shown in solid lines in FIG. 2, the fingers 84 extend substantially into the bale case 20 at the end of a working stroke. Further, at the end of a return stroke, the fingers 84 are positioned outside of side wall 80 as indicated by the dotted position of the fingers. Thus, it is seen that the feed fingers move completely across infeed chamber 75 on each working and return stroke. The fingers 84 are connected to the carriage 85 to pivot counterclockwise (FIG. 2) on a return stroke of the feeder whereby they will ride over hay in feed chamber 75. The fingers swing down for the next working stroke and extend generally perpendicular to the platform 76. Stop means, not shown, is provided to hold the fingers perpendicular on a working stroke.

Mounted on the pickup 50, on side walls 100 thereof (FIG. 3), is a windguard structure comprising a cross shaft 102 which extends parallel to the axis of rotation of the pickup and windguard rods 104 which extend rearwardly. The rods have free ends 106 (FIG. 1) which normally are spaced slightly from the stripper members 54 of the pickup. The windguard rods are pivotal about the axis of cross shaft 102, the rods being adapted to raise and lower responsive to the amount of crop material moving over the pickup and into chamber 75.

As shown in FIGS. 1 and 8–10, the roof 78 of the infeed chamber has a forwardly and upwardly extending portion 110 which together with the stripper members 54 of the pickup define a throat or inlet 111 to the infeed chamber 75.

The infeed mechanism is enclosed by a hood or housing 112 including a laterally projecting portion 114 which accommodates the carriage 85 in retracted position.

*Operation*

When the baler is towed across a field of cut and windrowed hay, the pickup 50 engages the crop material, as shown in FIG. 8, elevates it and conveys the material rearwardly into the infeed chamber 75. Carriage 85 reciprocates constantly in timed relation to the reciprocations of the plunger 29. Between successive working strokes of the plunger, that is, movement of the plunger rearwardly in the bale chamber, the feed fingers 84 convey the crop material into bale case 20.

The feed mechanism operates across the full length of the infeed chamber 75 (FIGS. 5–7). On each working stroke, the feed fingers 84 convey substantially all of the material in the infeed chamber into the bale case. During the first part of a feeding stroke, the hay in the infeed chamber becomes compressed and its density increased as it is moved toward the feed opening 26 (FIG. 6). However, as the charge of hay reaches the portion 82 of platform 76 the size of the passage for the hay increases and the hay compression is more or less relieved. Thereafter, the entire charge is forced through feed opening 26 (FIG. 7) and directed against vertical side wall 24 of the bale case. The feed fingers 84 move substantially into the bale case and because of the slightly inclined extension of the fingers, they direct the material toward the upper outer corner of the bale case.

After the feed fingers 84 have completed a delivery stroke, and after they have been retracted so that they are clear of the bale case, plunger 29 moves rearwardly and catches the charge of hay before it can move back out of opening 26 because of the inherent resiliency in the material. The baler operates at high speed, there being a charge of material fed into the bale case approximately once every second.

When the pickup 50 elevates the crop material and delivers it to the infeed chamber 75, the material passes through the inlet or throat 111. The downwardly and rearwardly sloped portion 110 of the roof 78 in combination with the upwardly and rearwardly inclined stripper members 54, guides the material to its proper location (FIGS. 8 and 9). When the area defined by top wall 78, rear wall 79 and side walls 81 and 26 becomes completely filled with material, the density of the material will build up and offer a resistance to the pickup and the admission of more material (FIG. 10). The slip clutch 65 has a predetermined value and it is adapted to slip when a given resistance is encountered. FIG. 10 indicates a situation where the infeed chamber is completely full. The rotation of the pickup is temporarily arrested and the crop material is beginning to pile up in front of the pickup. It is thus seen, that only a limited amount of material can be delivered into the infeed chamber. Once a given density and volume of material is reached, no more material will be fed into the chamber.

In this invention, the size of the bale case 20 bears a direct relationship to the size of the infeed chamber 75. The size of the bale case is such that it is able to receive all of the material in the infeed chamber at one time, up to the maximum density as regulated by the pickup 50.

It will thus be seen that the infeed structure employed is unpluggable. The operator running the baler merely has to watch the pickup 50. When it slips and hay begins to accumulate in front of the pickup, he knows the chamber 75 is full and he has to slow down. Since the size of the infeed chamber 75 cannot receive and hold a volume and density of material over and above that which the bale case can receive, the operator of the baler need never have to stop his baling operation and manually unplug the feeding mechanism.

In prior structures, shear bolts are extensively used so that the feeding mechanism of the baler will be stopped when a plugging situation occurs. With the structure above described, there is no shear bolt breakage because the construction of the baler is such that a plugging situation which would be sufficient to snap a shear bolt is not allowed to occur.

Providing diverging walls in an infeed chamber so that material will be decompressed as it is fed toward a bale case provides much smoother feeding than was heretofore available. This is diametrically opposite to the usual procedure of precompressing the hay by running it through a narrower passage just prior to its being fed into the bale case.

In addition to the improved feed mechanism provided by this invention, an improved means is provided for driving the bale forming plunger. The face gear 30 provides a simple right angle drive from the source of power. The conventional gear box and crank arm is eliminated entirely. As shown in FIG. 4, the face gear and the pinion which drives it are carried on the same casting 32 whereby if it moves because of vibrations during the operation of the baler or for other reasons, the relative positions of the face gear and the pinion will nevertheless remain the same. By providing the teeth 38 on one side 36 of the face gear and having the crank pin 46 projecting from the opposite side of the gear, a very simple and easy means is provided for driving the plunger. Moreover, the longitudinal position of the pinion 40 need not be closely held with this structure since a variation will not affect its engagement with the teeth 38 there being substantial room for manufacturing tolerances.

While this invention has been described in connection with a particular embodiment thereof, it will be understood that it is capable of further modification, and this application is intended to cover any variations, uses, or adaptations, of the invention, following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay baler comprising, in combination, a frame, a bale case mounted on said frame, said bale case being of a given size and having a feed opening, a plunger reciprocable in said bale case and past said opening, a crop material receiving chamber mounted on said frame, said chamber communicating with said feed opening and having an inlet through which material may be admitted, means on said frame moving crop material through said inlet and into said chamber, drive means connected to and operating said moving means, said drive means including a slip clutch responsive to attaining a maximum density of material in said chamber, said chamber having a volumetric capacity related to said bale case size whereby the bale case is able to receive all of the material in said chamber at one time when the material is at said maximum density and at lesser densities, and means operative in said chamber substantially emptying the chamber of material and feeding such material through said feed opening between successive working strokes of said plunger regardless of slippage in said drive for said crop material moving means.

2. A hay baler comprising, in combination, a mobile frame adapted for ground travel forwardly, a fore-and-aft extending bale case mounted on said frame, said bale case being of a given size and having a feed opening in a vertical side wall thereof, a plunger reciprocable in said bale case and past said opening, a crop material receiving chamber extending transversely relative to said bale case and communicating with said feed opening, said chamber being supported on said frame and having a forwardly directed inlet through which material may be admitted, a pickup mounted on said frame and operable to lift crop material from the ground and convey it rearwardly through said inlet and into said chamber, drive means connected to and operating said pickup, said drive means including a slip clutch responsive to the attaining of a maximum density of material in said chamber, said chamber having a volumetric capacity related to said bale case size whereby the bale case is able to receive all of the material in said chamber at one time when the material is at said maximum density and at lesser densities, and means operative in said chamber substantially emptying the chamber of material and feeding such material through said feed opening between successive working strokes of said plunger.

References Cited in the file of this patent

UNITED STATES PATENTS

| | | |
|---|---|---|
| 1,687,516 | Rollman | Oct. 16, 1928 |
| 2,324,261 | Krause | July 13, 1943 |
| 2,489,198 | Russell | Nov. 22, 1949 |
| 2,608,929 | Paradise et al. | Sept. 2, 1952 |
| 2,725,009 | Bornzin | Nov. 29, 1955 |
| 2,757,602 | Nolt | Aug. 7, 1956 |
| 2,817,944 | Callum | Dec. 31, 1957 |
| 2,817,945 | McClellan | Dec. 31, 1957 |
| 2,862,347 | Nelson | Dec. 2, 1958 |
| 2,884,850 | Nolt | May 5, 1959 |
| 2,948,101 | Long | Aug. 9, 1960 |